United States Patent [19]
Sato

[11] Patent Number: 5,440,430
[45] Date of Patent: Aug. 8, 1995

[54] FIVE-ELEMENT TELESCOPIC ZOOMING LENS

[75] Inventor: Haruo Sato, Kawasaki, Japan

[73] Assignee: Nikon Corporation, Tokyo, Japan

[21] Appl. No.: 93,728

[22] Filed: Jul. 20, 1993

Related U.S. Application Data

[63] Continuation of Ser. No. 958,172, Oct. 8, 1992, abandoned.

Foreign Application Priority Data

Oct. 15, 1991 [JP] Japan ................................. 3-266547

[51] Int. Cl.⁶ .............................................. G02B 15/14
[52] U.S. Cl. ...................................... 359/683; 359/684
[58] Field of Search ........................ 359/683, 685, 684

[56] References Cited

U.S. PATENT DOCUMENTS

| | | | |
|---|---|---|---|
| 4,702,567 | 10/1987 | Kato et al. ........................ | 359/684 |
| 5,042,927 | 8/1991 | Ogawa et al. ..................... | 359/683 |
| 5,126,883 | 6/1992 | Sato et al. ........................ | 359/683 |
| 5,185,678 | 2/1993 | Arimoto ............................ | 359/683 |
| 5,241,421 | 8/1993 | Endo et al. ....................... | 359/684 |

*Primary Examiner*—Scott J. Sugarman
*Attorney, Agent, or Firm*—Shapiro and Shapiro

[57] ABSTRACT

A five-element telescopic zooming lens system comprises, in the order from the object side, a first lens group having a positive refractive power, a second lens group having a negative refractive power, a third lens group having a positive refractive power, a fourth lens group having a positive refractive power, and a fifth lens group having a negative refractive power. When a magnification factor is to be changed from a wide angle end to a telephoto end, an on-axis air gap between the first lens group and the second lens group is increased while an on-axis air gap between the second lens group and the third lens group is reduced and an on-axis air gap between the fourth lens group and the fifth lens group is reduced. The third lens group is linearly driven while it meets various conditions.

10 Claims, 4 Drawing Sheets

FIVE-ELEMENT TELESCOPIC ZOOMING LENS

This is a continuation of application Ser. No. 958,172, filed Oct. 8, 1992, now abandoned.

BACKGROUND OF THE INVENTION

1. Field of the Invention

The present invention relates to a five-element telescopic zooming lens which is relatively compact, has a small number of lens elements and exhibits a good performance over an entire zooming range.

2. Related Background Art

A telescopic zooming lens which exhibits a good focusing performance over an entire zooming range, is light in brightness, is of low cost and has a large magnification ratio has been demanded and many proposals therefor have been made.

Examples of a five-element zooming lens which is of low cost and compact are disclosed in U.S. Pat. No. 5,042,927 and U.S. Pat. No. 5,126,883 filed by the present assignee.

SUMMARY OF THE INVENTION

The five-element zooming lenses disclosed in U.S. Pat. No. 5,042,927 and U.S. Pat. No. 5,126,883 are compact, are small in the number of lens elements and are of low cost.

However, in the zooming lenses, there is a problem of aberration correction because of large off-axis aberration due to magnification and large variation in spherical aberration. As a result, it is not possible to attain wide angle of a field at a wide angle end, a high magnification ratio and compactness.

The variation of the aberration by the magnification is specifically explained below.

As to image plane distortion, it usually distores positively at a wide angle end, distores negatively at a mid-focal distance state, and distores further negatively at a telephoto end.

As to coma aberration, downward coma aberration appears remarkably, and it significantly displaces positively at the wide angle end to exhibit so-called outward coma trend. At the mid-focal point state, it displaces negatively to exhibit so-called inward coma trend. It also displaces negatively at the telephoto end to exhibit the inward coma trend.

As to the spherical aberration, it is of relatively negative value at the wide angle end to substantially exhibit a normal full correction shape. However, at the mid-focal distance state, the spherical aberration by a light ray close to an optical axis significantly displaces positively and the spherical aberration by a peripheral light ray displaces negatively compared to that at the wide angle end so that it exhibits the opposite shape to that at the wide angle end. At the telephoto end, it returns to the shape at the wide angle end and approaches to the normal spherical aberration correction.

Because the aberration varies over the entire range of magnification, it is desired to provide a relatively stable performance over the entire magnification range.

It is therefore an object of the present invention to provide a telescopic zooming lens which solves the problems of the aberration correction, has a good focusing performance which is stable over the entire magnification range, is compact and of low cost.

The optical system of the present invention comprises, in the order from the object side; a first lens group having a positive refractive power; a second lens group having a negative refractive power; a third lens group having a positive refractive power; a fourth lens group having a positive refractive power; and a fifth lens group having a negative refractive power. When a magnification factor is to be changed from a wide angle end to a telephoto end, an on-axis air gap between the first lens group and the second lens group is increased while an on-axis air gap between the second lens group and the third lens group is reduced and an on-axis air gap between the fourth lens group and the fifth lens group is reduced. It is preferable that the third lens group is nonlinearly moved and a drive distance of the third lens group measured from the wide angle end meets the following condition:

$$0 < X_{3T} - X_{3M} \leq |X_{3M}| \quad (1)$$

In the above optical system, it is further preferable that the following conditions are met:

$$D_M \geq D_T \geq D_W \quad (2)$$

$$0.08 \geq (D_M - D_W)/f_W \geq 0.24 \quad (3)$$

$$0 < (D_M - D_T)/f_W \geq 0.24 \quad (4)$$

$$1 < f_{23}/f_{25} \leq 2.7; \; f_{23} < 0 \; f_{25} < 0 \quad (5)$$

$$2.6 \leq f_{45}/f_{25} \leq 8.5; \; f_{45} < 0 \; f_{25} < 0 \quad (6)$$

where
- $f_W$: focal distance of the entire system at the wide angle end,
- $f_T$: focal distance of the entire system at the telephoto end,
- $f_M = (f_W \cdot f_T)^{\frac{1}{2}}$: focal distance of the entire system at an intermediate focal distance,
- $X_{3M}$: drive distance of the third lens group at the intermediate focal distance $f_M$ measured from the wide angle end,
- $X_{3T}$: drive distance of the third lens group at the telephoto end measured from the wide angle end, with a direction toward the object being negative.
- $D_M$: on-axis air gap from an apex of a plane of the third lens group closest to the image at the intermediate focal distance $f_M = (f_W \cdot f_T)^{\frac{1}{2}}$ of the entire system, to an apex on a plane of the fourth lens group closest to the object,
- $D_W$: on-axis air gap from the apex of the plane of the third lens group closest to the image at the focal distance $f_W$ of the entire system at the wide angle end, to the apex of the plane of the fourth lens group closest to the object,
- $D_T$: on-axis gap from the apex of the third lens group closest to the image at the focal distance $f_T$ of the entire system at the telephoto end, to the apex of the plane of the fourth lens group closest to the object, with a direction toward the object being negative.
- $f_{23}$: combined focal distance of the second lens group and the third lens group at the telephoto end,
- $f_{45}$: combined focal distance of the fourth lens group and the fifth lens group at the telephoto end, and $f_{25}$: combined focal distance of the second lens group, the third lens group, the fourth lens group and the fifth lens group at the telephoto end.

The present invention solves the problem of the prior art five-element zooming lens by improving a drive system for a third lens group $G_3$.

In the five-element zooming lens, a light ray passes through a lens center of a first lens group $G_1$ at the wide angle end and the light ray does not pass through some peripheral areas. Accordingly, a weight is usually put on the correction of the spherical aberration at the telephoto end and the downward coma aberration in the first lens group $G_1$, and the downward coma aberration and the image plane distortion at the wide angle end are usually primarily corrected in the second lens group $G_2$.

The spherical aberration of the wide angle end is primarily corrected by the second lens group $G_2$, the third lens group $G_3$ and the fourth lens group $G_4$, and the spherical aberration at the telescope end is primarily corrected by the first lens group $G_1$. In this case, the correction of the spherical aberration at the mid-focal distance state is affected by both the first lens group $G_1$ and the second lens group $G_2$ which plays roles of correcting the spherical aberrations at the wide angle end and the telephoto end. It is significantly affected by the second lens group $G_2$ which has a negative refractive power so that it varies negatively at a peripheral area of the light beam and positively near the center of the light beam. Accordingly, the correction of the spherical aberration at the wide angle end and the telephoto end as well as the correction of the spherical aberration at the mid-focal distance state are required.

However, since the light ray is directed up to a relatively peripheral area in the second lens group $G_2$ at the wide angle end and the telephoto end, it plays a role of correcting the respective aberrations with balance rather than correcting a particular aberration.

The discrepancy in the aberration correction is one of causes of the variation of the downward coma aberration and the image plane distortion due to the magnification variation.

In the present invention, when the magnification is varied from the wide angle end to the telephoto end, the third lens group $G_3$ is driven in a U-shape locus having a convex plane thereof faced to an object. As a result, the third lens group $G_3$ is largely driven toward the object at the mid-focal distance state so that it approaches to the second lens group $G_2$. Further, the fourth lens group $G_4$ is brought far away to cancel the positive spherical aberration excessively created in the third lens group $G_3$ so that the spherical aberration at the mid-focal distance state is effectively corrected and the variation of the spherical aberration due to the magnification variation is reduced as a whole.

An air gap between the third lens group $G_3$ and the fourth lens group $G_4$ is effective to the correction of the image plane distortion. In order to reduce the variation of the image plane distortion from the mid-focal distance state to the telephoto end, the third lens group $G_3$ is moved toward the object to permit the correction of the negative image plane distortion at the telephoto end in a positive direction.

At the telephoto end, it is moved toward the image and the affect to the off-axis light ray is reduced. Accordingly, in the second lens group $G_2$, the freedom to the correction of the coma aberration (particularly the downward coma aberration) at the wide angle end and the image plane distortion increases and better correction at each magnification factor is attained.

Accordingly, by largely moving the third lens group $G_3$ toward the object at the mid-focal distance state, the spherical aberration is well corrected and a relatively large aperture is attained in the zoom lens of this type.

By using the magnification variation system of the present invention, the number of lens groups is reduced and a compact zoom lens is attained. In order to fully attain the advantage of the present invention, the following conditions are preferably to be met.

$$0 < X_{3T} - X_{3M} \leq |X_{3M}| \quad (1)$$

$$D_M \geq D_T \geq D_W \quad (2)$$

$$0.08 \leq (D_M - D_W)/f_W \leq 0.24 \quad (3)$$

$$0 < (D_M - D_T)/f_W \leq 0.24 \quad (4)$$

$$1 < f_{23}/f_{25} \leq 2.7; f_{23} < 0, f_{25} < 0 \quad (5)$$

$$1 \approx f_{45}/f_{25} \leq 8.5; f_{45} < 0, f_{25} < 0 \quad (6)$$

The condition (1) relates to a drive distance of the third lens group $G_3$.

In the condition (1), if a drive distance $X_{3T}$ at the telephoto end of the third lens group $G_3$ is equal to a drive distance $X_{3M}$ at the mid-focal distance state of the third lens group $G_3$, then $X_{3T} - X_{3M} = 0$ which means that there is no movement of the third lens group $G_3$ from the mid-focal distance state to the telephoto end. When the drive distance of the third lens group $G_3$ at the telephoto end is zero, then $X_{3T} = 0$ and $0 - X_{3M} = |X_{3M}|$ which means that the third lens group $G_3$ is at the same position at the wide angle end and the telephoto end.

If the lower limit of the condition (1) is exceeded, the drive locus of the third lens group $G_3$ cannot make a U-turn and the spherical aberration at the mid-focal distance $f_M$ and the downward coma aberration at the wide angle end are deteriorated so that the correction of the spherical aberration and the image plane distortion are difficult to attain. On the other hand, when the upper limit is exceeded, the third lens group $G_3$ is displaced toward the telephoto end beyond the position at the wide angle end and more closely to the image. As a result, the effect of the present invention is excessive and the variation of the aberrations increases.

Further, an incidence height of the primary light to the first lens plane at the telephoto end materially goes farther away from the optical axis, a diameter of a front lens of the first lens group increases, and the size of the entire system increases.

The condition (2) is a condition for the variation of the air gap between the third lens group $G_3$ and the fourth lens group $G_4$ which is caused by the movement of the third lens group when the magnification is varied. If the condition is not met, the downward coma aberration at the wide angle end, the spherical aberration at the mid-focal distance state and the variations of the coma aberration and the image plane distortion due to the magnification variation increase. Thus, in order to attain a high performance over the entire magnification range, the number of lens elements is to be increased, which leads to the increase of the size. Accordingly, the compact and bright zoom lens which has a large magnification ratio cannot be attained.

The condition (3) sets a difference between the air gaps between the third lens group $G_3$ and the fourth lens group $G_4$ at the mid-focal distance $f_M$ and the wide angle end $f_W$ which is caused by the movement of the third lens group $G_3$. If the lower limit of the condition (3) is exceeded, the drive distance of the third lens group $G_3$ is reduced and the downward coma aberration is deteriorated, the variation of the spherical aberration due to the magnification variation increases, and the variations of the image plane distortion and the astigmatism due to the magnification variation increase. On the other hand, when the upper limit is exceeded, the problem relating to the aberration correction is relatively small but since the drive distance of the third lens group increases, it is necessary to secure a sufficient air gap between the second lens group $G_2$ and the third lens group $G_3$. As a result, the size of the entire lens system increases.

The condition (4) sets a difference between the air gap between the third lens group $G_3$ and the fourth lens group lens $G_4$ at the mid-focal distance $f_M$ and the air gap between the third lens group $G_3$ and the fourth lens group $G_4$ at the telephoto end $f_r$ which is caused by the movement of the third lens group $G_3$. If the lower limit of the condition is exceeded, the correction of the downward coma aberration, the correction of the variation of the off-axis aberration due to the magnification variation, the correction of the image plane distortion at the telephoto end, the correction of the spherical aberration due to the magnification variation and the correction of the spherical aberration at the mid-focal distance state are difficult to attain, and it is difficult to attain a compact and bright zoom lens which has a large magnification ratio. On the other hand, when the upper limit is exceeded, the third lens group $G_3$ is largely moved toward the image at the telephoto end and an incident height of a primary light to the first lens plane at the telephoto end materially goes away from the optical axis. As a result, the diameter of the front lens of the first lens group $G_1$ increases and the size of the entire system increases.

It is assumed that the zoom lens of the present invention is a telescopic lens comprising three groups, positive, negative and negative groups at the telephoto end. The first lens group $G_1$ having a positive refractive power is defined as a front group $G_1$, and the second lens group $G_2$ and the third lens group $G_3$ are combined into one intermediate group $G_{2.3}$ having a negative refractive power. The fourth lens group $G_4$ and the fifth lens group $G_5$ are combined into a rear lens group $G_{4.5}$ having a negative refractive power. A combined focal distance $f_{2.5}$ of the intermediate group $G_{2.3}$ having the negative refractive power and the rear group $G_{4.5}$ having the negative refractive power is defined by $$1/f_{2.5} = 1/f_{2.3} + 1/f_{4.5} - D_T/f_{2.3} \cdot f_{4.5} \quad (a)$$

where $f_{2.5}<0$, $f_{2.3}<0$, $f_{4.5}<0$, $D_T>0$, $f_{2.3}$ is a focal distance of the intermediate group $G_{2.3}$, $f_{4.5}$ is a focal distance of the rear group $G_{4.5}$ and $D_T$ is a primary point distance between the third lens group $G_3$ and the fourth lens group $G_4$.

Assuming that the intermediate group $G_{2.3}$ and the rear group $G_{4.5}$ is one group $G_{2.5}$ having a negative refractive power, it is equivalent to a positive/negative telephoto lens. By enhancing the negative refractive power of the negative group $G_{2.5}$, the telescope ratio is varied and the size at the telescope ratio is varied and the size at the telescope end is reduced. As a result, the size of the entire system is reduced. In order to enhance the negative refractive power, the refractive powers of the intermediate group $G_{2.3}$ which is the combination of the second lens group $G_3$ and the third lens group $G_3$, and the rear group $G_{4.5}$ which is the combination of the fourth lens group $G_4$ and the fifth lens group $G_5$ may be enhanced, or the principal point distance $D_T$ between the third lens group $G_3$ and the fourth lens group $G_4$ may be increased.

However, since the principal point distance $D_T$ varies with the movement of the third lens group $G_3$ and it is set to a certain value in order to correct the variation of the aberrations due to the magnification variation.

Accordingly, it is necessary to properly set the refractive powers of the intermediate group $G_{2.3}$ and the rear group $G_{4.5}$, and it is preferable to meet the following conditions.

The condition (5) sets a ratio of the combined negative focal distance at the telephoto end of the second lens group $G_2$ and the third lens group $G_3$ to the combined negative focal distance at the telephoto end of the second lens group to the fifth lens group $G_5$. If the lower limit is exceeded, the combined negative refractive power of the intermediate group $G_{2.3}$ is lowered and the spherical aberration is deteriorated. In addition, the spherical aberration due to the magnification variation and the variation of the upward coma aberration increase. On the other hand, when the upper limit is exceeded, the combined negative refractive power of the intermediate group $G_{2.3}$ is lowered so that when the same telescope ratio is applied while the combined focal distance $f_{2.5}$ of the second lens group $G_2$ through the fifth lens group $G_5$ is kept constant, the negative refractive power of the rear group $G_{4.5}$ is to be lowered. As a result, the upward coma aberration at the telephoto end is deteriorated, and the variation of the image plane distortion due to the magnification variation increases and the positive distortion aberration also increases.

When the upper limit is set to 2.5, the effect of the present invention is further attained.

The condition (6) sets a ratio of the negative combined focal distance $f_{4.5}$ of the rear group $G_{4.5}$ and the negative combined focal distance $f_{2.5}$ of the second lens group $G_2$ through the fifth lens group $G_5$. If the lower limit is exceeded, the negative refractive force of the rear group $G_{4.5}$ is enhanced and the positive distortion is excessive. Further, the upper coma aberration at the telephoto end is deteriorated and the variation of the image plane distortion due to the magnification variation increases. On the other hand, when the upper limit is exceeded, the negative combined refractive power of the rear group $G_{4.5}$ is lowered and the total length increases. This is against the compactness.

In order to keep the telescope ratio at constant, it is necessary to keep the combined focal distance of the second lens group $G_2$ through the fifth lens group $G_5$ at constant and enhance the negative refractive power of the intermediate group $G_{2.3}$. As a result, the spherical aberration is deteriorated and the variation of the downward coma aberration due to the magnification variation increases.

When the lower limit is set to 3.5 and the upper limit is set to 7.8, the effect of the present invention is further assured.

When the fourth lens group $G_4$ of the present invention is fixed during the variation of the magnification, the design of a structure of a lens barrel is facilitated, the eccentricity is prevented and a better zoom lens is provided.

When the following conditions are met, a better effect is attained.

$$0.6 \leq f_3/f_w \leq 1.6 \tag{7}$$

$$0.95 \leq f_4/f_w \leq 2 \tag{8}$$

$$-1.4 \leq f_5/f_w \leq -0.57 \tag{9}$$

where $f_3$: focal distance of the third lens group $G_3$
$f_4$: focal distance of the fourth lens group $G_4$
$f_5$: focal distance of the fifth lens group $G_5$ The conditions (7) and (8) define the optimum ranges of the focal distances of the third lens group $G_3$ and the fourth lens group $G_4$, respectively. When the lower limits of the conditions (7) and (8) are exceeded, it is difficult to correct the spherical aberration and a Petzval sum increase positively. As a result, the image plane distortion and the astigmatism are deteriorated. On the other hand, when the upper limits of the conditions (7) and (8) are exceeded, the Petzval sum decreases and the balance of the image plane distortion, the astigmatism and the spherical aberration is lost. As a result, a good focusing performance at an off-axis point is not attained.

When the lower limit of the condition (8) is set to 1.1, the effect is further enhanced.

The condition (9) defines the range of the optimum focal distance of the fifth negative lens group $G_5$. When the lower limit is exceeded, the negative refractive power of the fifth lens group $G_5$ is lowered and the fourth lens group $G_4$ and the fifth lens group $G_5$ at the telephoto end mechanically interfere to each other. As a result, it is difficult to attain a high magnification ratio and the size of the lens system increases. On the other hand, when the upper limit is exceeded, the negative refractive power of the fifth lens group $G_5$ increases, the upward coma aberration and the variation of the image plane distortion due to the magnification variation increase, and the positive distortion aberration increases.

When the upper limit is set to $-0.8$, the effect of the present invention is further enhanced.

A diaphragm is preferably arranged between the second lens group $G_2$ and the third lens group $G_3$, or between the third lens group $G_3$ and the fourth lens group $G_4$, or in the third lens group $G_3$ or the fourth lens group $G_4$.

By introducing an aspherical plane in the vicinity of the diaphragm S or in the first lens group $G_1$ to correct the spherical aberration, a larger diameter of the lens is permitted.

By introducing the aspherical planes in the second lens group $G_2$ and the fifth lens group $G_5$, the coma aberration and the distortion aberration can be better corrected, the number of lenses is reduced and the size reduction is attained.

To focus to a near distance object, the first lens group $G_1$ may be moved toward the object or a so-called inner focus system by the third lens group $G_3$ and the fourth lens group $G_4$ may be employed. In this case, the variation of the total length in focusing is eliminated.

Figure 2:
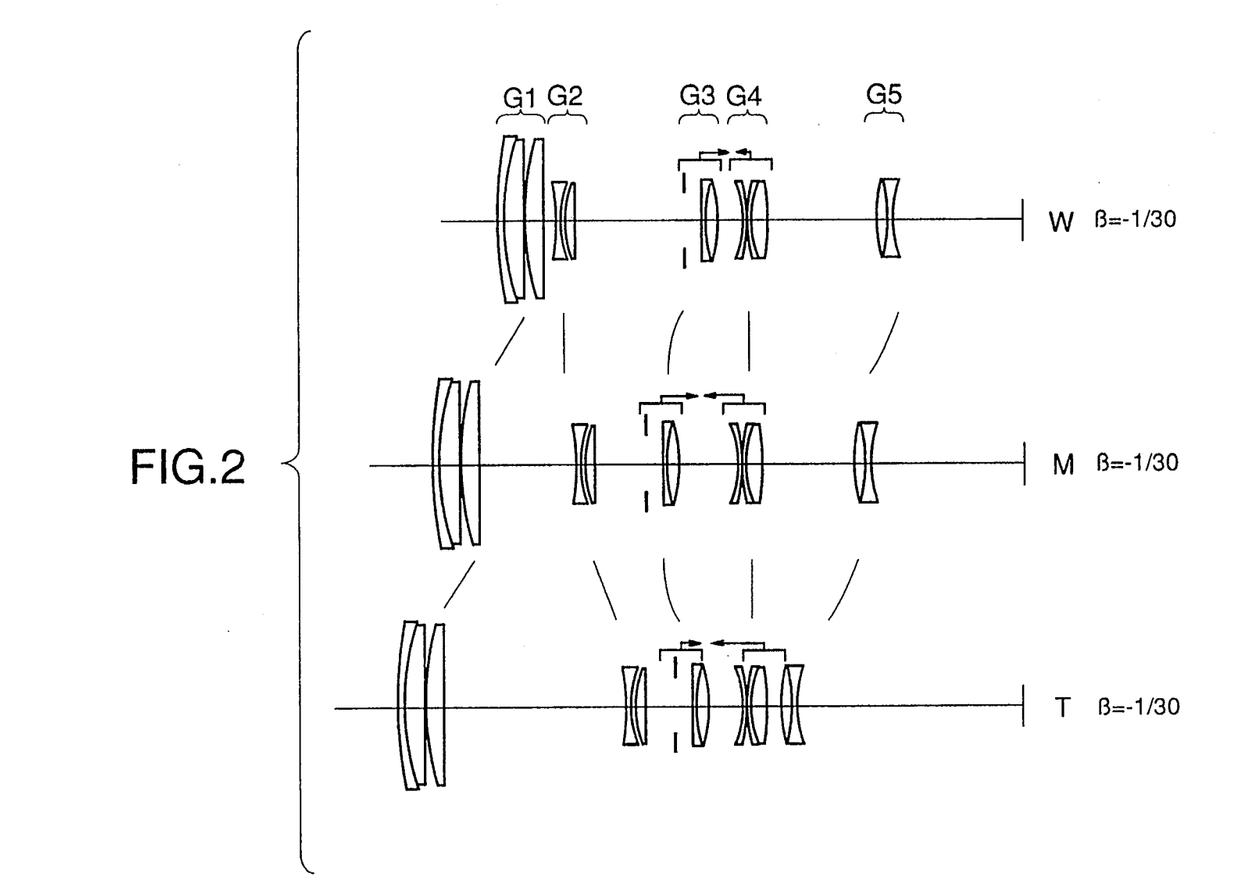
FIG. 2 shows a lens construction at a near distance in the Embodiment 1.

In a focusing system of an Embodiment 1 shown in FIG. 2, the third lens group $G_3$ is moved toward the image when the lens is focused from an infinite point to a near distance object and the fourth lens group $G_4$ is moved toward the object simultaneously. The lenses are moved with different drive ratios from the wide angle end to the telephoto end to improve the balance of the aberration corrections at various magnification ratios, particularly the balance of the spherical aberrations and the image plane distortions to minimize the near distance variation.

However, it is preferable for reducing the near distance variation that the drive ratio of the third lens group $G_3$ and the fourth lens group $G_4$ is such that the drive distance of the lens group $G_3$ is larger at the wide angle end and the drive distance of the fourth lens group $G_4$ is larger at the telephoto end.

The directions of the drive of the third lens group $G_3$ and the fourth lens group $G_4$ for focusing are shown by arrows and the drive distances are shown by lengths of the arrows.

In order to enhance the performance at the near distance, one of the drive distances of the third lens group $G_3$ and the fourth lens group $G_4$ may be zero at any focal distance to better attain the aberration correction.

When the following conditions are met, the effect of the present invention is further enhanced.

$$0 \leq |C_{4W}| \leq 1 \tag{10}$$

$$0 \leq |C_{3T}| \leq 1 \tag{11}$$

where $C_{4W}$: drive ratio of the fourth lens group $G_4$ for focusing when the drive distance of the third lens group for focusing is normalized to unity at the wide angle end.

$C_{3T}$: drive ratio of the third lens group for focusing when the drive distance of the fourth lens group for focusing is normalized to unity at the telephoto end.

When the condition (10) is exceeded, the image plane distortion at the in-focus position is displaced negatively.

When the condition (11) is exceeded, the image plane distortion at the in-focus position is displaced negatively and the spherical aberration at the in-focus position is also displaced negatively. As a result, the focusing performance is deteriorated.

In accordance with the present invention, the stable and excellent performance is attained over the entire magnification range, the number of lenses is reduced, the compactness is maintained, the high magnification ratio is maintained and the large aperture is attained.

DETAILED DESCRIPTION OF THE PREFERRED EMBODIMENTS

Figure 1:
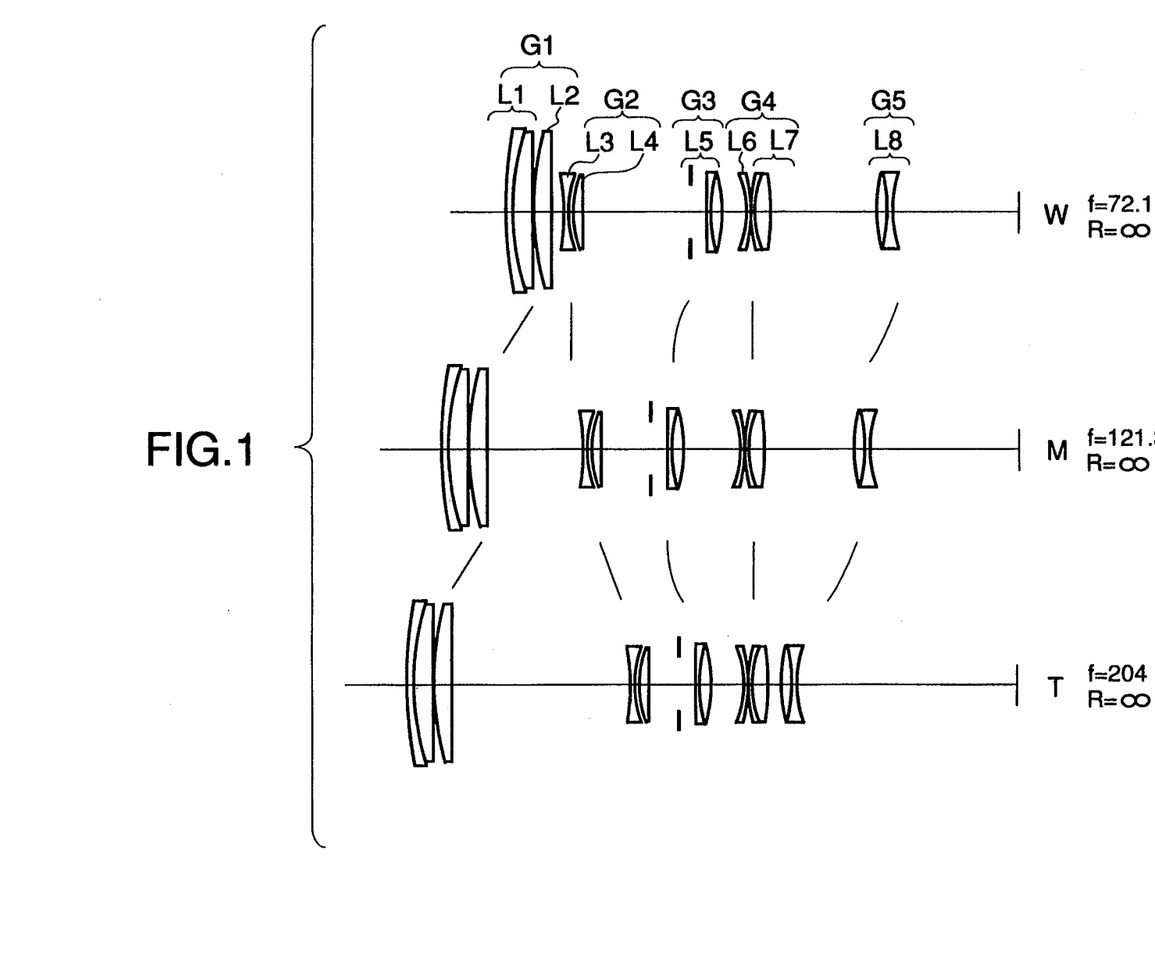
FIG. 1 shows a lens construction of an Embodiment 1 of the present invention.
Figure 3:
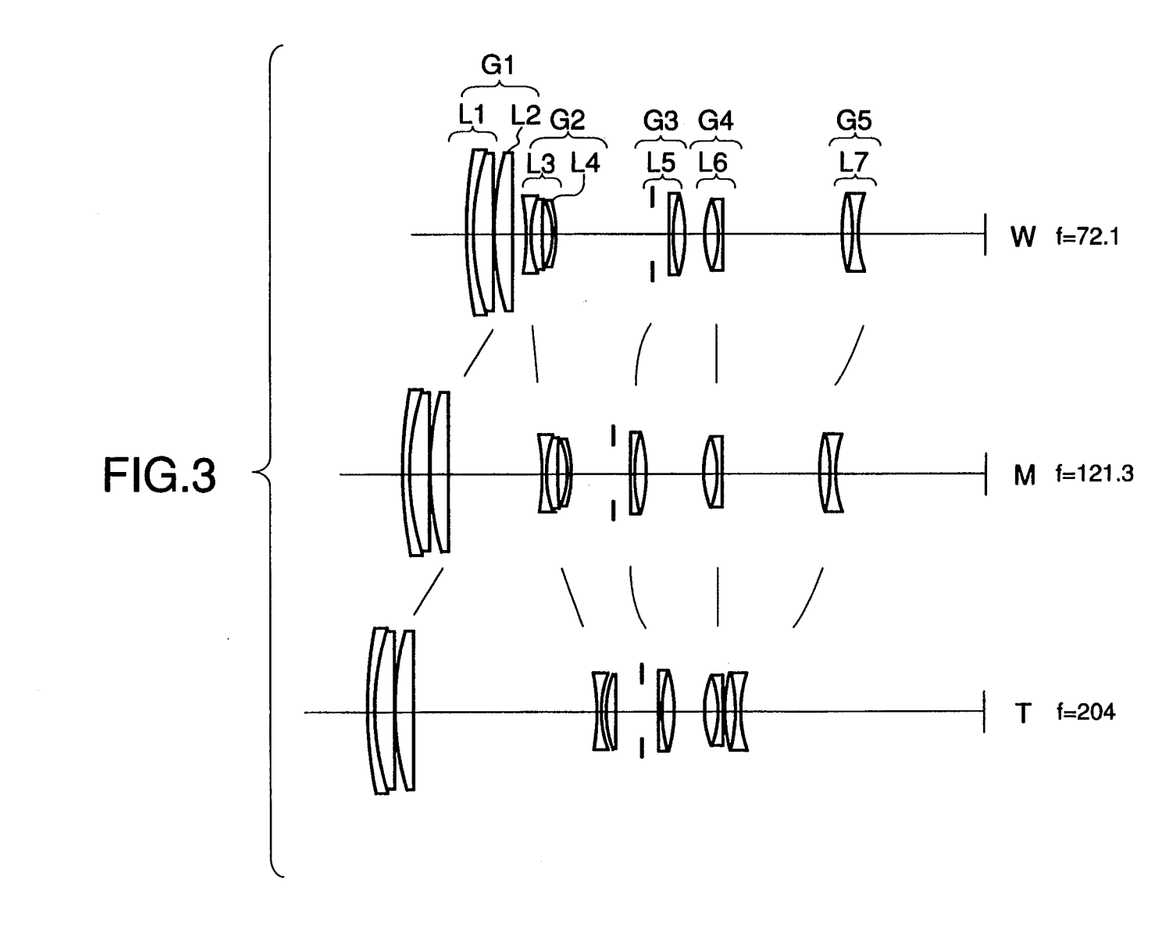
FIG. 3 shows a lens construction of an Embodiment 2 of the present invention.
Figure 4:
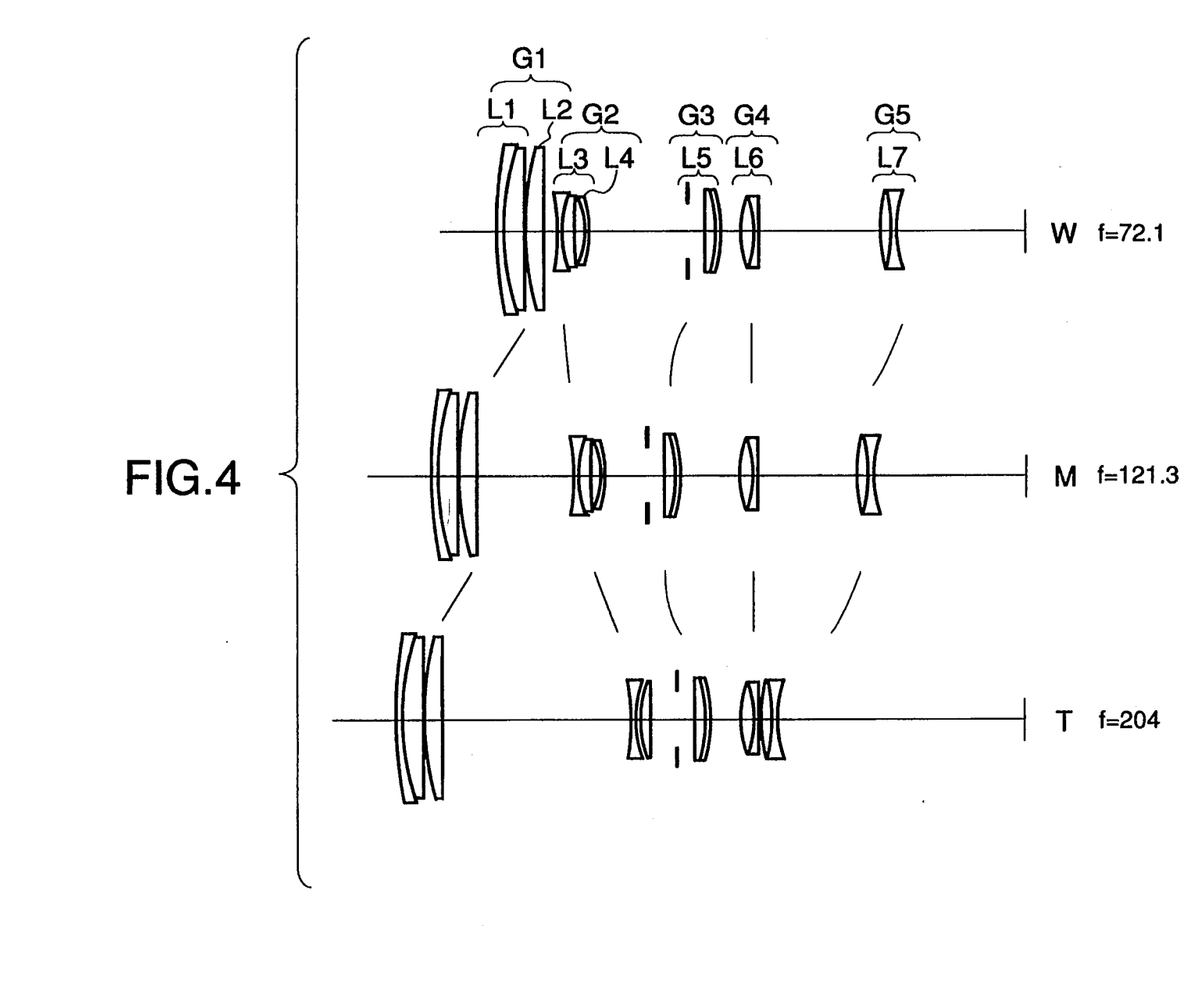
FIG. 4 shows a lens construction of an Embodiment 3 of the present invention.

FIGS. 1, 3 and 4 show lens constructions of the Embodiments 1, 2 and 3 of the present invention, respectively.

The Embodiment 1 comprises a first lens group $G_1$ including a cemented positive lens $L_1$ of a negative meniscus lens $L_{11}$ having a convex plane thereof faced to an object and a positive lens $L_{12}$ and a positive lens $L_2$, a second lens group $G_2$ including a biconvex negative lens $L_3$ and a positive meniscus lens $L_4$ having a convex plane thereof faced to the object, a third lens group $G_3$ including a cemented positive lens $L_5$ of a negative lens $L_{51}$ and a positive lens $L_{52}$, a fourth lens group $G_4$ including a negative meniscus lens $L_6$ having a concave plane thereof faced to the object and a cemented lens $L_7$ of a negative meniscus lens having a convex plane thereof faced to the object and a positive lens $L_{72}$, and a fifth lens group $G_5$ including a cemented negative lens $L_8$ of a positive lens $L_{81}$ and a biconcave negative lens $L_{82}$.

The Embodiment 2 comprises, as shown in FIG. 3, a first lens group $G_1$ including a cemented lens $L_1$ of a negative meniscus lens $L_{11}$ having a convex plane thereof faced to the object and a positive lens $L_{12}$, and a positive lens $L_2$, a second lens group $G_2$ including a cemented negative lens $L_3$ of a biconvex negative lens $L_{31}$ and a positive meniscus lens $L_{32}$ having a concave plane thereof faced to the object, and a negative meniscus lens $L_4$ having a concave plane thereof faced to the object, a third lens group $G_3$ including a cemented positive lens $L_5$ of a negative lens $L_{51}$ and a positive lens $L_{52}$, a fourth lens group $G_4$ including a cemented positive lens $L_6$ of a positive lens $L_{61}$ having a convex plane thereof faced to the object and a negative lens $L_{62}$, and a fifth lens group $G_5$ including a cemented negative lens $L_7$ of a positive lens $L_{71}$ and a biconcave negative lens $L_{72}$.

The Embodiment 3 comprises, as shown in FIG. 4, a first lens group $G_1$ including a cemented positive lens $L_1$ of a negative meniscus lens $L_{11}$ having a convex plane thereof faced to the object and a positive lens $L_{12}$, and a positive lens $L_2$, a second lens group $G_2$ including a cemented negative lens $L_3$ of a biconcave negative lens $L_{31}$ and a positive meniscus lens $L_{32}$ having a convex plane thereof faced to the object, and a negative meniscus lens $L_4$ having a concave plane thereof faced to the object, a third lens group $G_3$ including a cemented positive lens $L_5$ of a positive lens $L_{51}$ having a convex plane thereof faced to the image and a negative meniscus lens $L_{52}$ having a convex plane thereof faced to the image, a fourth lens group $G_4$ including a cemented positive lens $L_6$ of a positive lens $L_{61}$ having a convex plane thereof faced to the object and a negative lens $L_{62}$, and a fifth lens group $G_5$ including a cemented negative lens $L_7$ of a positive lens $L_{71}$ and a biconcave lens $L_{72}$.

In the embodiments 1, 2 and 3, a diaphragm S is arranged between the second lens group $G_2$ and the third lens group $G_3$.

When the magnification factor is changed from the wide angle end to the telescope end, an on-axis air gap between the first lens group $G_1$ and the second lens group $G_3$ increases while an on-axis air gap between the second lens group $G_2$ and the third lens group $G_3$ decreases and an on-axis air gap between the fourth lens group $G_4$ and the fifth lens group $G_5$ decreases.

Namely, while the fourth lens group $G_4$ is fixed with respect to the image plane, the first lens group $G_1$ is moved toward the object, the second lens group $G_2$ is moved toward the image, the third lens group $G_3$ is nonlinearly moved, and the fifth lens group $G_5$ is moved toward the object.

By moving the third lens group $G_3$ toward the image and moving the fourth lens group $G_4$ toward the object with different focal distance ratios, the lens can be focused to a near distance object. As shown in the Embodiment 1, the variations of the aberrations for the near distance can be suppressed over the entire magnification range, and the coma aberration and the aberration variation of the image plane distortion can be suppressed.

Tables 1 to 3 show data of the Embodiments 1-3 of the present invention, in which f represents a focal distance, $F_{no}$ represents an F number, and $2\omega$ represents an image angle. Lefthand numerals in the table show the order as viewed from the object, r represents a radius of curvature of a lens, d represents a thickness of the lens and a plane-to-plane distance of the lenses, $\nu$ represents an Abbe's number, and n represent a number for a d-ray ($\lambda = 587.6$ nm).

TABLE 1

Data of Embodiment 1 f = 72.1~204 mm
$F_{no}$ = 4.6
$2\omega$ = 26.92°~11.70°

| | r | d | $\nu$ | n |
|---|---|---|---|---|
| 1 | 116.127 | 2.50 | 25.5 | 1.80458 |
| 2 | 66.003 | 5.50 | 58.9 | 1.51823 |
| 3 | 339.394 | 0.30 | | |
| 4 | 64.596 | 5.50 | 64.1 | 1.51680 |
| 5 | 1140.121 | (variable) | | |
| 6 | −63.967 | 1.80 | 55.6 | 1.69680 |
| 7 | 26.175 | 1.50 | | |
| 8 | 27.841 | 2.60 | 25.5 | 1.80458 |
| 9 | 62.585 | (variable) | | |
| 10 | 350.611 | 1.80 | 27.6 | 1.75520 |
| 11 | 60.534 | 4.50 | 64.1 | 1.51680 |
| 12 | −37.733 | (variable) | | |
| 13 | −27.164 | 2.00 | 35.2 | 1.74950 |
| 14 | −41.483 | 0.10 | | |
| 15 | 63.343 | 1.70 | 33.9 | 1.80384 |
| 16 | 26.291 | 6.00 | 47.1 | 1.67003 |
| 17 | −53.244 | (variable) | | |
| 18 | 101.552 | 3.00 | 29.5 | 1.71736 |
| 19 | −74.693 | 1.70 | 45.4 | 1.79668 |
| 20 | 39.204 | Bf | | |

| Group-to-group Distances | | | |
|---|---|---|---|
| F | 72.0943 | 121.3000 | 203.9993 |
| D0 | ∞ | ∞ | ∞ |
| d5 | 4.7155 | 29.4020 | 58.4414 |
| d9 | 36.9907 | 20.8495 | 13.9653 |
| d12 | 7.1439 | 17.5882 | 7.1439 |
| d17 | 33.6629 | 27.2187 | 5.5349 |
| Bf | 39.7191 | 46.1634 | 67.8468 |

| Group-to-group Distances at Magnification $\beta = -1/30$ | | | |
|---|---|---|---|
| D0 | 2055.7666 | 3502.9883 | 5915.7882 |
| d5 | 4.7155 | 29.4020 | 58.4414 |
| d9 | 39.6261 | 22.3862 | 14.8600 |
| d12 | 3.8497 | 14.5148 | 3.5651 |
| d17 | 34.3217 | 28.7553 | 8.2189 |
| Bf | 39.7191 | 46.1634 | 67.8468 |

| Conditions | |
|---|---|
| (1) | $X_{3T} - X_{3M} = 10.44$ |
| (3) | $(D_M - D_W)/f_W = 0.145$ |
| (4) | $(D_M - D_T)/f_W = 0.145$ |
| (5) | $f_{23}/f_{25} = 1.495$ |
| (6) | $f_{45}/f_{25} = 5.65$ |
| (7) | $f_3/f_W = 1.16$ |
| (8) | $f_4/f_W = 1.165$ |
| (9) | $f_5/f_W = -0.995$ |
| (10) | $|C_{4W}| = 0.25$ |
| (11) | $|C_{3T}| = 0.3333$ |

TABLE 2

Data of Embodiment 2 f = 72.1~204 mm
$F_{no}$ = 4.6
$2\omega$ = 34.72°~11.72°

| r | d | $\nu$ | n |
|---|---|---|---|

TABLE 2-continued

Data of Embodiment 2

| | | | | |
|---|---|---|---|---|
| 1 | 204.607 | 2.40 | 25.5 | 1.80458 |
| 2 | 89.992 | 5.35 | 64.1 | 1.51680 |
| 3 | −541.033 | 0.10 | | |
| 4 | 60.030 | 4.85 | 64.1 | 1.51680 |
| 5 | 260.216 | (variable) | | |
| 6 | −104.202 | 1.80 | 55.6 | 1.69680 |
| 7 | 31.844 | 2.85 | 25.5 | 1.80458 |
| 8 | 76.495 | 2.80 | | |
| 9 | −31.568 | 2.00 | 53.7 | 1.69350 |
| 10 | −45.264 | (variable) | | |
| 11 | −515.483 | 1.80 | 27.6 | 1.74077 |
| 12 | 122.815 | 4.20 | 64.1 | 1.51680 |
| 13 | −34.300 | (variable) | | |
| 14 | 35.744 | 5.00 | 47.1 | 1.62374 |
| 15 | −32.277 | 1.70 | 31.6 | 1.75692 |
| 16 | 430.414 | (variable) | | |
| 17 | 105.651 | 3.30 | 29.5 | 1.71736 |
| 18 | −49.792 | 1.70 | 45.4 | 1.79668 |
| 19 | 37.698 | Bf | | |

Group-to-group Distances

| F | 72.0960 | 121.3000 | 204.0004 |
|---|---|---|---|
| D0 | ∞ | ∞ | ∞ |
| d5 | 4.1310 | 30.0250 | 61.5658 |
| d10 | 33.5805 | 16.4476 | 5.6836 |
| d13 | 3.0465 | 13.7545 | 6.3285 |
| d16 | 27.7833 | 21.9110 | 0.6221 |
| Bf | 38.3608 | 44.2331 | 65.5218 |

Conditions (1) $X_{3T} - X_{3M} = 7.426$
(3) $(D_M - D_W)/f_W = 0.148$
(4) $(D_M - D_T)/f_W = 0.103$
(5) $f_{23}/f_{25} = 1.65$
(6) $f_{45}/f_{25} = 4.46$
(7) $f_3/f_W = 1.16$
(8) $f_4/f_W = 1.165$
(9) $f_5/f_W = -0.893$

TABLE 3

Data of Embodiment 3

$f = 72.1 \sim 204$ mm
$F_{no} = 4.6$
$2\omega = 34.6° \sim 11.7°$

| | r | d | ν | n |
|---|---|---|---|---|
| 1 | 254.178 | 2.40 | 25.5 | 1.80458 |
| 2 | 94.719 | 5.35 | 64.1 | 1.51680 |
| 3 | −299.845 | 0.10 | | |
| 4 | 61.442 | 4.85 | 64.1 | 1.51680 |
| 5 | 262.882 | (variable) | | |
| 6 | −88.504 | 1.80 | 55.6 | 1.69680 |
| 7 | 33.819 | 2.85 | 25.5 | 1.80458 |
| 8 | 81.745 | 2.80 | | |
| 9 | −32.985 | 2.00 | 53.9 | 1.71300 |
| 10 | −45.471 | (variable) | | |
| 11 | −301.015 | 3.70 | 70.4 | 1.48749 |
| 12 | −32.730 | 2.30 | 32.2 | 1.67270 |
| 13 | −35.412 | (variable) | | |
| 14 | 37.990 | 5.00 | 57.0 | 1.62280 |
| 15 | −32.278 | 1.80 | 31.6 | 1.75692 |
| 16 | 1304.296 | (variable) | | |
| 17 | 103.084 | 3.50 | 30.0 | 1.69895 |
| 18 | −41.273 | 1.70 | 45.0 | 1.74400 |
| 19 | 35.389 | Bf | | |

Group-to-group Distances

| F | 72.0962 | 121.3000 | 204.0004 |
|---|---|---|---|
| D0 | ∞ | ∞ | ∞ |
| d5 | 4.7959 | 30.1988 | 58.7508 |
| d10 | 33.0461 | 15.4595 | 2.6964 |
| d13 | 3.9517 | 15.6761 | 14.0682 |
| d16 | 26.7648 | 21.0836 | 0.5084 |
| Bf | 39.8350 | 45.5163 | 66.0916 |

Conditions (1) $X_{3T} - X_{3M} = 0.163$
(3) $(D_M - D_W)/f_W = 0.163$
(4) $(D_M - D_T)/f_W = 0.022$

TABLE 3-continued

Data of Embodiment 3

(5) $f_{23}/f_{25} = 1.45$
(6) $f_{45}/f_{25} = 6.40$
(7) $f_3/f_W = 1.16$
(8) $f_4/f_W = 1.165$
(9) $f_5/f_W = 0.93$

What is claim is:

1. An optical system comprising, in order from the object side;

a first lens group having a positive refractive power;

a second lens group having a negative refractive power;

a third lens group having a positive refractive power;

a fourth lens group having a positive refractive power; and a fifth lens group having a negative refractive power;

wherein when a magnification factor is to be changed from a wide angle end to a telephoto end, an on-axis air gap between the first lens group and the second lens group is increased while an on-axis air gap between the second lens group and the third lens group is reduced and an on-axis air gap between the fourth lens group and the fifth lens group is reduced, and the third lens group is nonlinearly moved and a drive distance of the third lens group measured from the wide angle end meets the following condition:

$$0 < X_{3T} - X_{3M} \leq |X_{3M}| \qquad (1)$$

where $f_W$: focal distance of the entire system at the wide angle end, $f_T$: focal distance of the entire system at the telephoto end, $f_M = (f_W \cdot f_T)^{\frac{1}{2}}$: focal distance of the entire system at an intermediate focal distance, $X_{3M}$: drive distance of the third lens group at the intermediate focal distance $f_M$ measured from the wide angle end, $X_{3T}$: drive distance of the third lens group at the telescope end measured from the wide angle end, with a direction toward the object being negative.

2. A telescopic zooming lens according to claim 1 wherein the following condition is met:

$$D_M \geq D_T \geq D_W \qquad (2)$$

where $D_M$: on-axis air gap from an apex of a plane of the third lens group closest to the image at the intermediate focal distance $f_M = (f_W \cdot f_T)^{\frac{1}{2}}$ of the entire system, to an apex on a plane of the fourth lens group closest to the object, $D_W$: on-axis air gap from the apex of the plane of the third lens group closest to the image at the focal distance $f_W$ of the entire system at the wide angle end, to the apex of the plane of the fourth lens group closest to the object, $D_T$: on-axis air gap from the apex of the third lens group closest to the image at the focal distance $f_T$ of the entire system at the telephoto end, to the apex of the plane of the fourth lens group closest to the object, with a direction toward the object being negative.

3. A telescopic zooming lens according to claim 2 wherein the following conditions are further met:

$$0.08 \leq (D_M - D_w)/f_w \leq 0.24 \quad (3)$$

$$0 < (D_M - D_T)/f_w \leq 0.24 \quad (4)$$

4. A telescopic zooming lens according to claim 3 wherein the following conditions are further met:

$$1 < f_{23}/f_{25} \leq 2.7; f_{23} < 0 f_{25} < 0 \quad (5)$$

$$2.6 \leq f_{45}/f_{25} \leq 8.5; f_{45} < 0 f_{25} < 0 \quad (6)$$

where
- $f_{23}$: combined focal distance of the second lens group and the third lens group at the telephoto end,
- $f_{45}$: combined focal distance of the fourth lens group and the fifth lens group at the telephoto end, and
- $f_{25}$: combined focal distance of the second lens group, the third lens group, the fourth lens group and the fifth lens group at the telephoto end.

5. In an optical system comprising, in order from the object side, a first lens group having positive refractive power, a second lens group having negative refractive power, a third lens group having positive refractive power, a fourth lens group having positive refractive power and a fifth lens group having negative refractive power and wherein when a variable power is effected from a wide angle end to a telephoto end, an on-axis air gap between the first and the second lens groups is increased while an on-axis air gap between the second and the third lens groups is reduced and an on-axis air gap between the fourth and the fifth lens groups is reduced, the optical system having a structure wherein when focusing from infinity to short distance object point is effected, at least the third lens group moves toward the image side, and the fourth lens group moves toward the object side, a drive ratio in each of focal distances of the lens groups moving for focusing being different at at least wide angle end and telephoto end.

6. An optical system according to claim 5, wherein the drive ratio of the third lens group and the fourth lens group is such that the drive distance of the third lens group is larger at the wide angle end than that of the fourth lens group and the drive distance of the fourth lens group is larger at the telephoto end than that of the third lens group.

7. An optical system according to claim 5, wherein in order to enhance the performance at the short distance, one of the drive distances of the third and the fourth lens groups becomes zero at any focal distance.

8. An optical system according to claim 5, which satisfies the following conditions:

$$0 \leq |C_{4w}| \leq 1$$

$$0 \leq |C_{3T}| \leq 1$$

where
- $C_{4w}$: drive ratio of the fourth lens group for focusing when the drive distance of the third lens group for focusing is normalized to unity at the wide angle end;

where
- $C_{3T}$: drive ratio of the third lens group for focusing when the drive distance of the fourth lens group for focusing is normalized to unity at the telephoto end.

9. In an optical system comprising, in order from the object side, a first lens group having positive refractive power, a second lens group having negative refractive power, a third lens group having positive refractive power, a fourth lens group having positive refractive power, a fifth lens group having negative refractive power and wherein when a variable power is effected from a wide angle end to a telephoto end, an on-axis air gap between the first and the second lens groups is increased while an on-axis air gap between the second and the third lens groups is reduced and an on-axis air gap between the fourth and the fifth lens groups is reduced, the optical system comprising a telescopic zooming lens which is provided with at at least one surface of aspherical form.

10. In an optical system comprising an internal focusing type zooming lens having, in order from the object side, a first lens group, a second lens group, a third lens group, a fourth lens group and a fifth lens group, and wherein when a variable power is effected from a wide angle end to a telephoto end, an on-axis air gap between the first and the second lens groups is increased while an on-axis air gap between the second and the third lens groups is reduced and an on-axis air gap between the fourth and the fifth lens groups is reduced, the optical system having a structure wherein when focusing from infinity to short distance object point is performed, at least the third lens group moves toward the image side, and the fourth lens group moves toward the object side, a drive ratio in each of focal distances of the lens groups moving for focusing being different at least wide angle end and telephoto end.

* * * * *